(12) United States Patent
Frantz et al.

(10) Patent No.: US 11,035,984 B2
(45) Date of Patent: Jun. 15, 2021

(54) ANTI-REFLECTIVE SURFACE STRUCTURES FORMED USING THREE-DIMENSIONAL ETCH MASK

(71) Applicant: The Government of the United States of America, as represented by the Secretary of the Navy, Arlington, VA (US)

(72) Inventors: Jesse A. Frantz, Washington, DC (US); Lynda E. Busse, Alexandria, VA (US); L. Brandon Shaw, Woodbridge, VA (US); Jasbinder S. Sanghera, Ashburn, VA (US); Ishwar D. Aggarwal, Waxhaw, NC (US); Menelaos K. Poutous, Harrisburg, NC (US)

(73) Assignee: The Government of the United States of America, as represented by the Secretary of the Navy, Washington, DC (US)

( * ) Notice: Subject to any disclaimer, the term of this patent is extended or adjusted under 35 U.S.C. 154(b) by 223 days.

(21) Appl. No.: 15/834,819

(22) Filed: Dec. 7, 2017

(65) Prior Publication Data

US 2018/0172882 A1    Jun. 21, 2018

Related U.S. Application Data

(60) Provisional application No. 62/431,167, filed on Dec. 7, 2016.

(51) Int. Cl.
*G02B 1/113* (2015.01)
*G02B 1/111* (2015.01)
*G02B 1/118* (2015.01)

(52) U.S. Cl.
CPC ............. *G02B 1/113* (2013.01); *G02B 1/111* (2013.01); *G02B 1/118* (2013.01)

(58) Field of Classification Search
None
See application file for complete search history.

(56) References Cited

U.S. PATENT DOCUMENTS

| 8,187,481 | B1 | 5/2012 | Hobbs | |
|---|---|---|---|---|
| 2011/0149399 | A1* | 6/2011 | Peng | G02B 1/118 359/580 |
| 2013/0128362 | A1* | 5/2013 | Song | G02B 1/11 359/601 |
| 2018/0011564 | A1* | 1/2018 | Aurongzeb | G02B 1/118 |

OTHER PUBLICATIONS

L.E. Busse et al., "Anti-reflective surface structures for spinel ceramics and fused silica windows, lenses, and optical fibers," Opt. Mater. Express 4, 2504-2515 (2014).

(Continued)

*Primary Examiner* — Derek S. Chapel
(74) *Attorney, Agent, or Firm* — US Naval Research Laboratory; Sean M. Walsh

(57) ABSTRACT

The invention relates to methods for fabricating antireflective surface structures (ARSS) on an optical element using a three-dimensional film layer applied to the surface of the optical element. The methods beneficially permit materials that do not exhibit local variation in physical and chemical properties to be provided with ARSS. Optical elements having ARSS on at least one surface are also provided.

14 Claims, 4 Drawing Sheets

(56) References Cited

OTHER PUBLICATIONS

L.E. Busse et al., "Review of antireflective surface structures on laser optics and windows," Appl. Opt. 54, F303 (2015).
D.S. Hobbs, et al. "Laser damage resistant anti-reflection microstructures in Raytheon ceramic YAG, sapphire, ALON, and quartz," SPIE Defense, Security, and Sensing 2011, p. 80160T-80160T.
J.J. Cowan "Aztec surface-relief volume diffractive structure," JOSA A 7, 1529-1544 (1990).
G. Sapkota et al. "Characterization of random anti-reflecting surface structures and their polarization response at off-normal angles of incidence," Proc. of SPIE vol. 9927 (Sep. 15, 2016).
C.D. Taylor et al. "Optical performance of random anti-reflection structures on curved surfaces," SPIE 9359, 935916 (Mar. 16, 2015).

\* cited by examiner

ANTI-REFLECTIVE SURFACE STRUCTURES FORMED USING THREE-DIMENSIONAL ETCH MASK

CROSS-REFERENCE TO RELATED APPLICATIONS

This application claims priority to U.S. Provisional Application No. 62/431,167, filed on Dec. 7, 2016, the contents of which are incorporated herein by reference in their entirety.

TECHNICAL FIELD

This application relates generally to methods for fabricating antireflective surface structures (ARSS) on an optical element using a three-dimensional film layer applied to the surface of the optical element. The methods beneficially permit materials that do not exhibit local variation in physical and chemical properties to be provided with ARSS. Optical elements having ARSS on at least one surface are also provided.

BACKGROUND OF THE INVENTION

Each surface of an optical surface (such as a lens, a window, or the end face of an optical fiber) reflects some portion of the light incident upon it. These reflections, known as "Fresnel reflections" can be undesirable for a variety of reasons. These include reduced transmittance; feedback into laser systems; and stray reflections. Fresnel reflections can be particularly problematic in systems with multiple optical elements, where the system suffers from the combined effects of reflection from many surfaces.

It was suggested by Lord Rayleigh in 1879 that a gradual transition in refractive index could serve to nearly eliminate the reflectance from a surface (Rayleigh, "On reflection of vibrations at the confines of two media between which the transition is gradual," *Proc Lond. Math Soc* sl-11, 51-56 (1879)). However, due to limitations in available materials, such a structure has been impossible to fabricate.

In bulk optics, Fresnel reflections are traditionally reduced using thin film dielectric stacks of materials with differing refractive indices. Thin film interference effects in these stacks lead to antireflective (AR) properties. Such coatings may be designed to reduce reflections for a limited spectral and angular range. To achieve performance over a broader spectral and/or angular range, many layers may be required. High-performance coatings often contain more than one hundred layers. Depositing such coatings is time consuming and costly. In addition to high cost, there are several additional problems associated with dielectric coatings. They exhibit laser induced damage thresholds (LIDTs) significantly lower than those of the bulk optics and are subject to environmental degradations and delamination under thermal cycling. Furthermore, dielectric AR coatings may suffer from strong polarization effects, with optical properties that depend on the polarization of the incident light.

One approach that has proven effective in reducing Fresnel reflections while avoiding the problems associated with traditional AR coatings is the direct patterning of ARSSs on the surface of optics (L. E. Busse, et al., "Anti-reflective surface structures for spinel ceramics and fused silica windows, lenses and optical fibers," *Opt. Mater. Express* 4, 2504-2515 (2014); L. E. Busse, et al., "Review of antireflective surface structures on laser optics and windows," *Appl. Opt.* 54, F303 (2015); and U.S. Pat. No. 8,187,481). Processing of these structures does not involve a permanent coating on the optic, but instead relies on nano-patterning of the surface of the optical material itself, where the refractive index and wavelengths dictate the particular microstructures needed. State-of-the-art processing has resulted in antireflective performance of ARSS comparable to that of the traditional AR coatings, while adding significant advantages such as higher laser damage thresholds (D. S. Hobbs, et al., "Laser damage resistant anti-reflection microstructures in Raytheon ceramic YAG, sapphire, ALON, and quartz," in *SPIE Defense, Security. and Sensing* (International Society for Optics and Photonics, 2011), p. 80160T-80160T), wide spectral bandwidths, large acceptance angles (J. J. Cowan, "Aztec surface-relief volume diffractive structure," *JOSA A* 7, 1529-1544 (1990)), polarization independence (G. Sapkota, et al., "Characterization of random anti-reflecting surface structures and their polarization response at off-normal angles of incidence," in *Proc. SPIE* v. 9927, *Nano-engineering: Fabrication, Properties, Optics, and Devices XIII*, E. M. Campo, et al., eds. (2016), 992712), and excellent performance on curved optics (C. Taylor, et al., "Optical performance of random anti-reflection structures on curved surfaces," in *Proc. SPIE* v. 9359, *Optical Components and Materials XII*, S. Jiang et al., eds. (2015), 935916).

ARSS can occur in nature, with an array of nanoscale structures in a regular, repeating pattern. Such a structure is often called "moth eye" because of its similarity to the naturally occurring ARSS structures found on moths' eyes. Theoretical models have been developed for ordered, microstructured surfaces on optics, whereby the surface features mimic the microscopic, pillar-like structures found on the surface of a moth's eye that reduce visible reflections and protect it from predatory owls (C. G. Bernhard et al., "A corneal nipple pattern in insect compound eyes," *Acta Physiol. Scand.* 56, 385-386 (1962)), yielding expected optical performance for appropriate sizes and shapes of the microstructures in optical surfaces to reduce reflections (W. H. Southwell, "Gradient-index antireflection coatings," *Opt. Lett.* 8, 584-586 (1983); W. H. Southwell, "Pyramid-array surface-relief structures producing antireflection index matching on optical surfaces," *J. Opt. Soc. Am.* A 8, p. 549-553 (1991); J. J. Cowan, "Aztec surface-relief volume diffractive structure," *J. Opt. Soc. Am.* A 7, p. 1529-1544 (1990); and P. Lalanne et al., "On the effective medium theory of subwavelength periodic structures," *J. Mod. Opt.* 43, 2063-2086 (1996)).

There has been a considerable amount of work to develop lithography techniques and dry or wet etching to create these ordered "moth eye" ARSS features in the surfaces of optics (T. Lohmueller, et al., "Improved Properties of Optical Surfaces by Following the Example of the 'Moth Eye'," *Biomimetics Learning From Nature*, ed. by A. Mukherjee, (Intech, 2010), Ch. 22; Y. Kanamori, et al., "Broadband antireflection gratings for glass substrates fabricated by fast atom beam etching," *Jpn. J. Appl. Phys.* 39, p. L 735-L 737 (2000); C. Aydin, et al., "Reduction of reflection losses in $ZnGeP_2$ using motheye antireflection surface relief structures," *Appl. Phys. Lett.* 80 242-2244 (2002); D. S. Hobbs, et al., "Design, fabrication, and measured performance of anti-reflecting surface textures in infrared transmitting materials," *Proc. SPIE* 5786, 40-57 (2005)). Ordered moth eye is typically created using photolithography or is stamped with a patterned shim.

Alternately, ARSS may consist of random features which, on average, have the appropriate scale but are randomly distributed in position and/or feature dimensions. Random ARSS (rARSS) may be created via a dry etch process. Prior work has focused on creating random features in the surface of optics to reduce reflections in glass and silicon using reactive gas ion etching (M. J. Minot, "Single-layer, gradient refractive index antireflection films effective from 0.35 to 2.5 µm," *J. Opt. Soc. Am.*, 66:515-519 (1976); U.S. Pat. No. 4,229,233 (1980)), and in borosilicate glass by using chemical etching (L. M. Cook, et al., "Antireflective surfaces for high-energy laser optics formed by neutral solution processing," *Appl. Opt.* 21:1482-1485 (1982); L. M. Cook, et al., "Integral antireflective surface production on optical glass," *Comm. Amer. Ceram. Soc.* C152-155 (1982)). In some materials, local randomness in material composition alone leads to the desired random features. See, for example, U.S. Pat. No. 8,187,481.

Benefits of providing optics with random ARSS microstructures are that fewer steps are required since lithography is not needed, scale-up to large sizes is possible (J. A. Frantz, et al., "Random anti-reflection structures on large optics for high energy laser applications," *Proc. SPIE* 9726, Solid State Lasers XXV: Technology and Devices (2016), 97261T), and ARSS can be easily formed on curved optics (C. Taylor, et al., "Optical performance of random antireflection structures on curved surfaces," in *Proc. SPIE* v. 9359, *Optical Components and Materials XII*, S. Jiang et al., eds. (2015), 935916).

However, one challenge in fabricating rARSS by etching is the fact that formation of random features during RIE is material dependent. For example, fabrication of rARSS is known to work well in glasses such as silica, in which the material has no long range structure and which has micro- and nano-scale variation in chemical and physical properties. Many materials that are of interest for the fabrication of optics or optical detectors are not glasses, but are instead monocrystalline or polycrystalline, and do not have the local variation in chemical or physical properties required to form to rARSS during RIE. In such materials, rARSS do not form spontaneously during RIE.

SUMMARY OF THE INVENTION

The invention described herein, including the various aspects and/or embodiments thereof, meets the unmet needs of the art, as well as others, by providing methods for fabricating antireflective surface structures (ARSS) on an optical element using a three-dimensional film layer applied to the surface of the optical element. The methods beneficially permit materials that do not exhibit local variation in physical and chemical properties to be provided with ARSS. Optical elements having ARSS on at least one surface are also provided.

In one aspect of the invention, a method for fabricating an antireflective surface structure (ARSS) on an optical element includes providing an optical element, applying a film layer to at least one surface of the optical element, and etching the film layer, forming a three-dimensional film having ARSS on the surface of the optical element.

In a further aspect of the invention, the method further includes etching the at least one surface of the optical element through the three-dimensional film having ARSS, wherein ARSS are formed on the at least one surface of the optical element.

In another aspect of the invention, an optical element includes a monocrystalline or polycrystalline material having ARSS etched into at least one surface. Individual ARSS features exhibit center-to-center width of adjacent features that varies according to $0.1 \leq d \leq 10$, where d equals a wavelength for which reduced reflection is desired, divided by twice the refractive index of the material used to form the optical element, and peak-to-peak height of adjacent features that varies according to $0.1 \leq H \leq 10$, where H equals one-half of the wavelength for which reduced reflection is desired.

In yet another aspect of the invention, an optical element includes a monocrystalline or polycrystalline material, and a film layer having ARSS etched therein. Individual ARSS features exhibit center-to-center width of adjacent features that varies according to $0.1 \leq d \leq 10$, where d equals a wavelength for which reduced reflection is desired, divided by twice the refractive index of the material used to form the optical element, and peak-to-peak height of adjacent features that varies according to $0.1 \leq H \leq 10$, where H equals one-half of the wavelength for which reduced reflection is desired.

Other features and advantages of the present invention will become apparent to those skilled in the art upon examination of the following or upon learning by practice of the invention.

DETAILED DESCRIPTION OF EMBODIMENTS OF THE INVENTION

Figure 1:
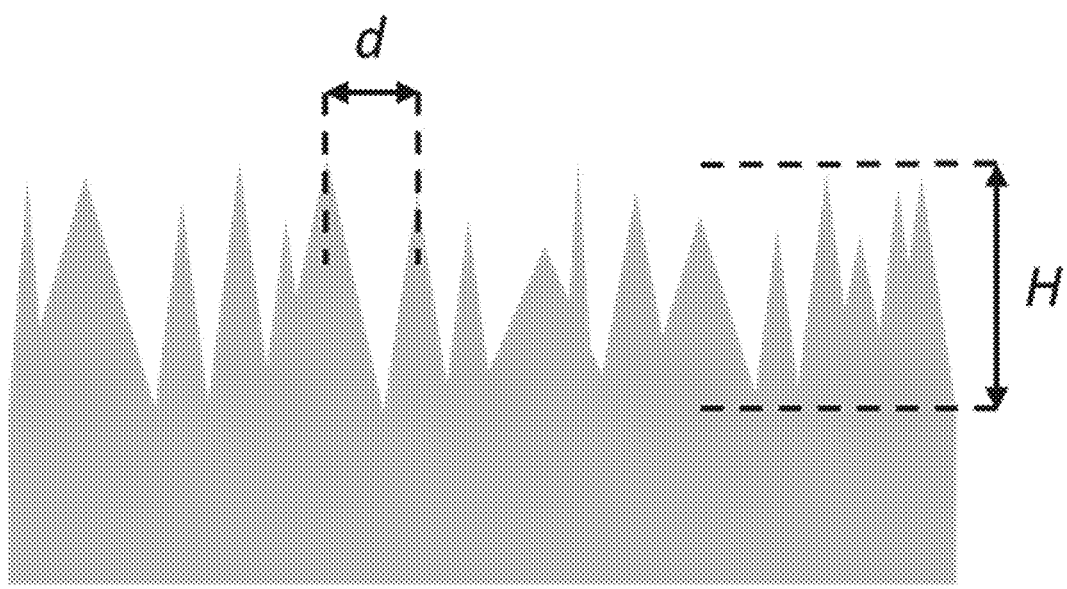
FIG. 1 is a schematic diagram of a cross section of an optical surface having random ARSS features across the surface.

The invention described herein, including the various aspects and/or embodiments thereof, meets the unmet needs of the art, as well as others, by providing methods for fabricating antireflective surface structures (ARSS) on an optical element using a three-dimensional film layer applied to the surface of the optical element. The methods beneficially permit materials that do not exhibit local variation in physical and chemical properties to be provided with ARSS. Optical elements having ARSS on at least one surface are also provided.

ARSS may be understood conceptually as providing a gradual transition in refractive index from one medium (medium A) to another (medium B). As light passes from A to B, the effective index in a given plane increases from that of A to that of B, as more of the area of a given plane is composed of medium B.

Optical Elements.

Optics or optical elements that are encompassed by the invention include, but are not limited to, windows, lenses, mirrors, end faces of optical fibers (where the fiber may be bare, or connectorized in a commercially-available or custom fiber connector), filters, beamsplitters, prisms, gratings, and diffusers. The optic may be an end cap that is cemented or fusion spliced to the end of an optical fiber. The optic may be a lens at the end of an optical fiber, and may be a standard refractive or graded index (GRIN) lens that is cemented or fusion spliced to the end of the fiber. Alternately the optic may be a lens that is formed directly on the end of the fiber by machining or by thermal processing. In addition to planar optical elements, such as windows, ARSS may be fabricated on non-planar optical elements in which one or both surfaces have a positive or negative curvature, or are conic sections or are otherwise aspherical, using the methods of the invention. The ARSS described here can be applied to an optical element having any surface configuration, including, for example, surfaces that are flat, curved, or conic sections, or otherwise aspherical surfaces.

The wavelengths being transmitted by the optical elements of the invention, which are used as a point of reference for the period of the pattern and the height of the ARSS structures, include the wavelengths that encompass the visible spectrum (i.e., wavelengths from about 390 nm to about 700 nm), as well as near ultraviolet (i.e., wavelengths from about 300 nm to about 400 nm). In some aspects of the invention, the wavelengths being transmitted make up one of the regions of infrared radiation: near infrared (i.e., wavelengths from about 0.75 µm to about 1.4 µm), short-wavelength infrared (i.e., wavelengths from about 1.4 µm to about 3 µm), mid-wavelength infrared (i.e., wavelengths from about 3 µm to about 8 µm), and long-wavelength infrared (i.e., wavelengths from about 8 µm to about 15 µm).

The wavelengths to be transmitted (and not reflected) are influenced by the materials selected to form the optical elements of the invention. The optical elements may be formed from any optical material that can be etched, including silica having the composition $SiO_x$ (where x is from 1 to 3), silicate glasses (e.g., glasses primarily comprising $SiO_2$, including fused silica glass (which is 100% $SiO_2$), as well as glasses that combine $SiO_2$ with one or more additional compounds (such as borosilicate glass, soda-lime glass, alkali-free glass, lead glass, etc.)).

Preferred materials for use in the methods and optical elements of the invention are monocrystalline or polycrystalline materials, which lack local variations in chemical or physical properties needed to form ARSS during etching. These include, but are not limited to, magnesium aluminate spinel ($MgAl_2O_4$), $CaF_2$, Ge, Si, diamond, alumina, III-V semiconductors, and II-VI semiconductors. The III-V semiconductor materials comprise elements from Group IIIA of the Periodic Table (now IUPAC Group 13), which includes Al, Ga, and In, and elements from Group VA of the Periodic Table (now IUPAC Group 15), which includes N, P, As, and Sb. These III-V semiconductor materials include, but are not limited to, AlN, AlP, AlAs, AlSb, GaN, GaP, GaAs, GaSb, InN, InP, InAs, and InSb (and are preferably selected from GaAs, InP, GaP, and GaN). The II-VI semiconductor materials comprise elements from Group IIB of the Periodic Table (now IUPAC Group 12), which includes Zn and Cd, and chalcogens from Group VIB of the Periodic Table (now IUPAC Group 16), which includes S, Se, and Te. These II-VI semiconductor materials include, but are not limited to, ZnS, ZnSe, ZnTe, CdS, CdSe, and CdTe.

The optical elements may include ARSS etched into the material forming the optical element.

In other embodiments, ARSS may be provided in a film layer deposited on the optical element. The film layer may have a thickness between 50 nm and 5 µm. In some aspects of the invention, the film layer preferably is formed from silica. The silica may have the composition $SiO_x$ (where x is from 1 to 3). Alternatively, a silicate glass film may be applied (e.g., a glass primarily comprising $SiO_2$, such as fused silica glass (which is 100% $SiO_2$), and other glasses that combine $SiO_2$ with one or more additional compounds (such as borosilicate glass, soda-lime glass, alkali-free glass, lead glass, etc.)). The film layer may also be formed of ZnO, or a polymer material. The polymer is preferably a photoresist polymer, and may be selected from polymethyl methacrylate (PMMA), polymethyl glutarimide (PMGI), polyimide (PI), phenol formaldehyde (PF), epoxy (e.g., SU-8), and combinations thereof.

The optical elements, regardless of configuration and composition, may be provided with ARSS or rARSS over all or a portion of their surface, depending on the particular application for the optical element. This may be accomplished by providing an etched film layer on the surface of the optic. This may also be accomplished by etching the surface of the optic using the film layer as an etch mask, where either the entire surface is etched, or a portion of the surface is etched and other portions are not etched. The optical elements may optionally be designed to have ARSS in more than one region, with each region having ARSS configured to reduce reflection of a different wavelength or range of wavelengths.

With reference to FIG. 1, the spacing of the ARSS features depends on the refractive index of the optical element, with the center-to-center spacing of adjacent features, d, being approximately less than the wavelength for which reduced reflection is desired, divided by twice the refractive index of the material used to form the optical element. The value of d may not be identical for all sets of adjacent features, and can vary by a factor of from 0.1 to 10 times its nominal value. Some features with an even smaller value of d may be present, and any such features may be treated together as a single feature for purposes of their optical properties. The height of the ARSS features is preferably selected to be approximately one-half the wavelength for which reduced reflection is desired, or approximately one-half of the smallest wavelength in the range of wavelengths for which reduced reflection is desired. H may be measured as the peak-to-peak height of the features. The value of H may not be identical for all sets of adjacent features, and can vary by a factor of from 0.1 to 10 times its nominal value. Some features with an even smaller value of H may be present, but do not have a significant impact on optical properties.

In practice, the ARSS formed by the methods of the invention may include a random array of nanoscale structures in which the width between the ARSS is less than the wavelength of electromagnetic radiation for which reduced reflection is desired. In other embodiments, the ARSS of the invention may be formed in a pattern on an optic, where the period of the ARSS that form the pattern is less than the wavelength of electromagnetic radiation for which reduced reflection is desired. When a range of wavelengths are transmitted through the optic, the width between structures or period of the pattern, respectively, are preferably less than the smallest wavelength in the range of wavelengths for which reduced reflection is desired.

The ARSS may be created in a manner that forms a pattern. This is typically the case, for example, when an ARSS is created photolithographically or stamped. In some aspects of the invention, the pattern is designed to produce ARSS features that are separated by the preferred widths (d) and exhibit the preferred heights (H), as defined above.

Alternately, the ARSS may be random or non-patterned ARSS (rARSS). When the term rARSS is used, it may be used to refer to the fact that the individual ARSS features do not exhibit a repeated pattern. For example, "random" may be used to refer to features that arise from processes having a random component, e.g. ablation rates that vary randomly from point to point on a surface of an optical element. rARSS may be created, for example, via etching, or irradiation and re-deposition processes. It is to be appreciated that when the ARSS features are random or non-patterned, although many or most of the features are preferably separated by the preferred widths (d) and exhibit the preferred heights (H) set forth above, there will also be features that do not conform. Preferably, less than 25% of the rARSS features do not conform to the preferred widths (d) and heights (H), more preferably less than 15%, still more preferably less than 10%, most preferably less than 5%.

In some aspects of the invention, rARSS are preferred. For example, randomness of feature sizes may allow rARSS to provide AR performance over a broader spectral range than ordered ARSS. Random features are distinct from those that arise from patterning with an ordered process, e.g. patterning with a photomask with a repeated, ordered pattern or multi-beam holographic exposure.

The ARSS formed by the methods of the invention, whether provided in a random array or formed as a pattern, preferably provide the optical element with individual features or structures having a height that is typically less than the wavelength of the electromagnetic radiation for which reduced reflection is desired. The height of the features may be from about 25% to about 200% of the wavelength of the electromagnetic radiation for which reduced reflection is desired. In some particularly preferred embodiments, they have a height that is about one-half of the wavelength for which reduced reflection is desired. This beneficially permits simulation of a graded index variation between the medium surrounding the optical element (which is preferably air, but may vary depending on the application for which the optic is used) and the material forming the optical element.

The invention provides optical elements that exhibit reduced surface reflections at specified wavelengths as compared to untreated optical elements. The term "reduced reflection," as used in accordance with the invention, refers to a reduction in the amount of reflection of a given wavelength of electromagnetic radiation over the area of the optical element upon which the ARSS or rARSS are formed. The reduction may be a complete reduction, i.e., 100% reduction in reflection. The reduction may also be a partial reduction, i.e., 10%, 20%, 30%, 40%, 50%, 60%, 70%, 80%, 90%. Preferably, the reduction in reflection at a given wavelength or over a range of wavelengths is at least 50%. More preferably the surface reflections are reduced by at least 90%.

The anti-reflective (AR) property of the optical elements having random ARSS formed by the methods of the invention may be optically broadband, with low reflection over a spectral band. The resulting spectral band is greater than that for either antireflective dielectric films or ordered ARSS. In some preferred aspects, the low reflection is provided over a spectral band that is at least about 2 µm wide, preferably at least about 4 µm wide, more preferably at least about 6 µm wide, even more preferably at least about 8 µm wide. Reduced surface reflection also serves to increase the amount of light transmitted through an optic, and prevents back reflections that can be detrimental to the performance of optical systems.

Providing ARSS on the surface of the optics of the invention beneficially yields transmission over a wider field of view and shows less dependence on polarization of the incident light on that surface, as compared to traditional antireflective coatings. The invention may also beneficially provide a significantly higher laser-induced damage threshold (LIDT) for the optical elements of the invention, in comparison to untreated optics, as well as dielectric antireflective-coated optics.

Methods

The inventive methods beneficially permit ARSS to be formed on materials which do not have local variation in physical and chemical properties.

This may be achieved by applying a three-dimensional film on the surface of the optic, and etching it to have the desired ARSS features. The etched film layer having ARSS may be left in place on the optical element to provide an anti-reflective coating.

Alternatively, the etched film layer having ARSS formed therein may be used as an etch mask on the surface of the optic, where the ARSS features are transferred into the optic during etching. When used as an etch mask, the film layer may be removed as part of the transfer etch process. Any remaining film may be etched away from the surface of the optic, leaving an optic patterned with ARSS.

Figure 2:
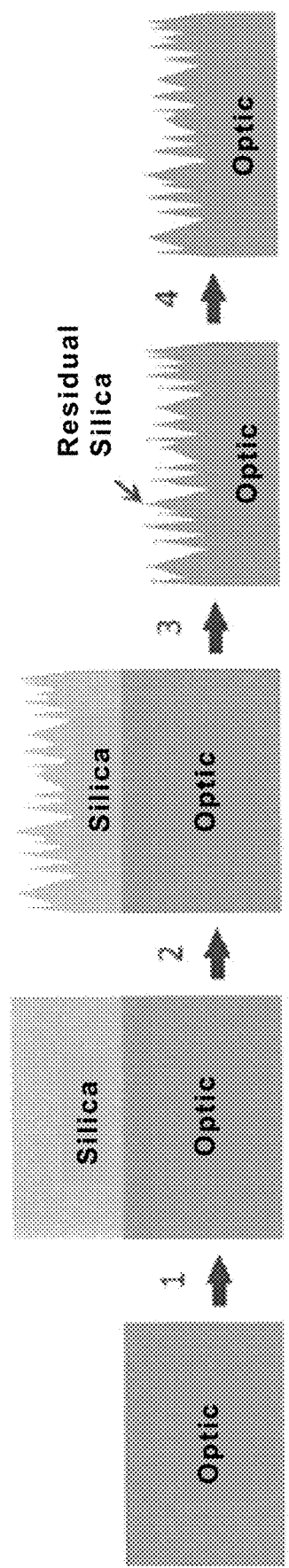
FIG. 2 is a diagram showing processing steps for making random ARSS using an etch mask.

The following procedure, illustrated in FIG. 2, may be used to prepare an optic having ARS S:

Step 1. Deposit a layer of film on the optic.
Step 2. Etch features into the film in order to create a 3D film having ARSS thereon.

In some aspects of the invention, the process may end after Step 2, and the film having ARSS may be used as an antireflective layer. In other aspects of the invention, additional process steps may be used to form ARSS features on the optical element, as follows:

Step 3. Perform a transfer etch to transfer the ARSS from the 3D film into the optic.
Step 4. Perform an optional wet etch to remove any residual film that was part of the etch mask.

In Step 1, an optical element material is selected for rARSS fabrication. The surface of the optical element material is cleaned with standard procedures appropriate for the chosen material.

A film layer having a thickness between 50 nm and 5 µm is deposited on the optic. In some aspects of the invention, the film layer preferably is formed from silica. The silica may have the composition $SiO_x$ (where x is from 1 to 3). Alternatively, a silicate glass film may be applied (e.g., a glass primarily comprising $SiO_2$, such as fused silica glass (which is 100% $SiO_2$), and other glasses that combine $SiO_2$ with one or more additional compounds (such as borosilicate glass, soda-lime glass, alkali-free glass, lead glass, etc.)). The film layer may also be formed of ZnO, or a polymer material. The polymer is preferably a photoresist polymer, and may be selected from polymethyl methacrylate (PMMA), polymethyl glutarimide (PMGI), polyimide (PI), phenol formaldehyde (PF), epoxy (e.g., SU-8), and combinations thereof.

Regardless of the composition of the film layer, it may be applied by sputtering but could also be applied using vacuum deposition, evaporation, chemical vapor deposition, pulsed laser deposition, sol-gel synthesis, spin casting, or any other suitable deposition method.

During Step 2, rARSS are created in the film layer by etching. The technique selected for etching may encompass wet' or dry etching techniques, depending on the specific film layer deposited on the optical element. For example, where the film layer is ZnO, a wet etch in an acid bath may be used. In some presently preferred aspects of the invention, a dry etch process is used. The dry etch processes that may be used in accordance with the methods of the invention encompass any technique in which the material being etched is bombarded with ions (which may be provided as a plasma of reactive gases) that dislodge portions of the material from the exposed surface. These may include high density plasma (HDP) etching, inductively coupled plasma reactive ion etching (ICP-RIE), and reactive ion etching (RIE).

Figure 3:
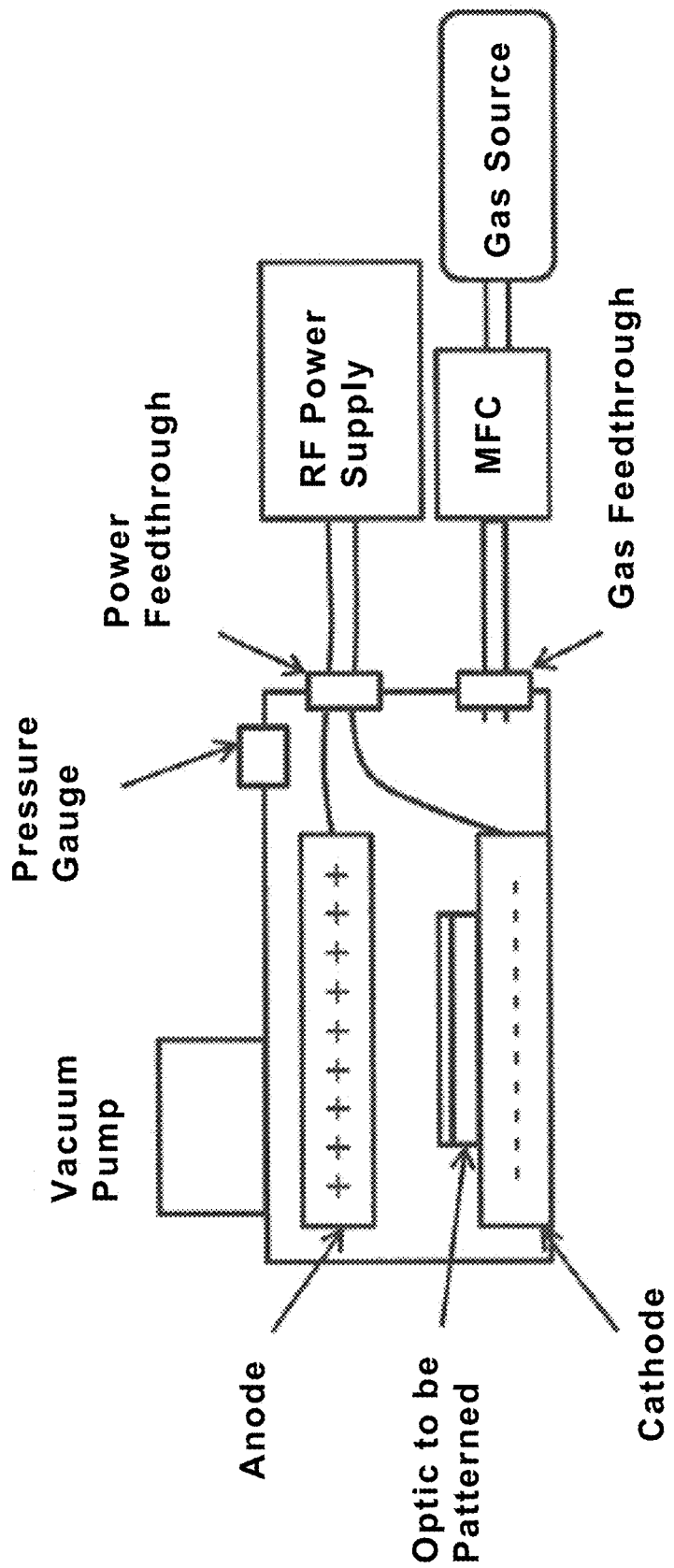
FIG. 3 is a diagram of a reactive ion etch chamber for use in etching ARSS features.

Etching may be carried out in a chamber, such as the RIE chamber illustrated in FIG. 3. An RIE etch process similar to that described in U.S. Pat. No. 8,187,481 (the contents of which are incorporated herein by reference in their entirety), may be carried out in the presence of suitable gases which may include $F^-$, $Cl^-$, $C^{+4}$, $O^{-2}$, $B^{+3}$, $S^{-2}$, and/or Ar ions. An inductively coupled plasma (ICP) may optionally be used. The plasma pressure is preferably maintained between 5 and 100 mT, and the gas flow is preferably maintained between 20 and 150 sccm. Etching is preferably carried out until peak-to-valley surface height of the features in the film layer is between 50 nm and 5 μm, preferably from 100 nm to 2 μm, more preferably between 200 nm to 500 nm.

In one aspect of the invention, the etched film layer having ARSS formed therein may be used as a three-dimensional anti-reflective layer on the optical element. In this aspect of the invention, the film layer having ARSS is not used as an etch mask, and is instead retained on the surface of the optical element.

In accordance with another aspect of the invention, the resulting etched film layer forms the "etch mask" that is used to form rARSS in the surface of the optical element. Use of the etched film layer as an etch mask is described in Step 3 and optional Step 4.

During Step 3, in which the etched film layer is used as an "etch mask" to form ARSS on the surface of the optical element, another etching step is carried out. Etching parameters, including gases, pressure, gas flow, and power may selected to be the same or different than those used during Step 2. As a result of this step, the ARSS created in the etch mask, or a transformed version of the ARSS, are transferred onto the surface of the optical element. The feature height in the optical element may be the same as, or different from, the features formed in the etch mask. The feature height may be selected based on the wavelength or wavelength range for which surface reflection is to be reduced. The ARSS formed by the methods of the invention, preferably provide the optical element with individual features or structures having a height that is less than the wavelength of the electromagnetic radiation for which reduced reflection is desired. In some particularly preferred embodiments, they have a height that is about one-half of the wavelength for which reduced reflection is desired.

Figure 4:
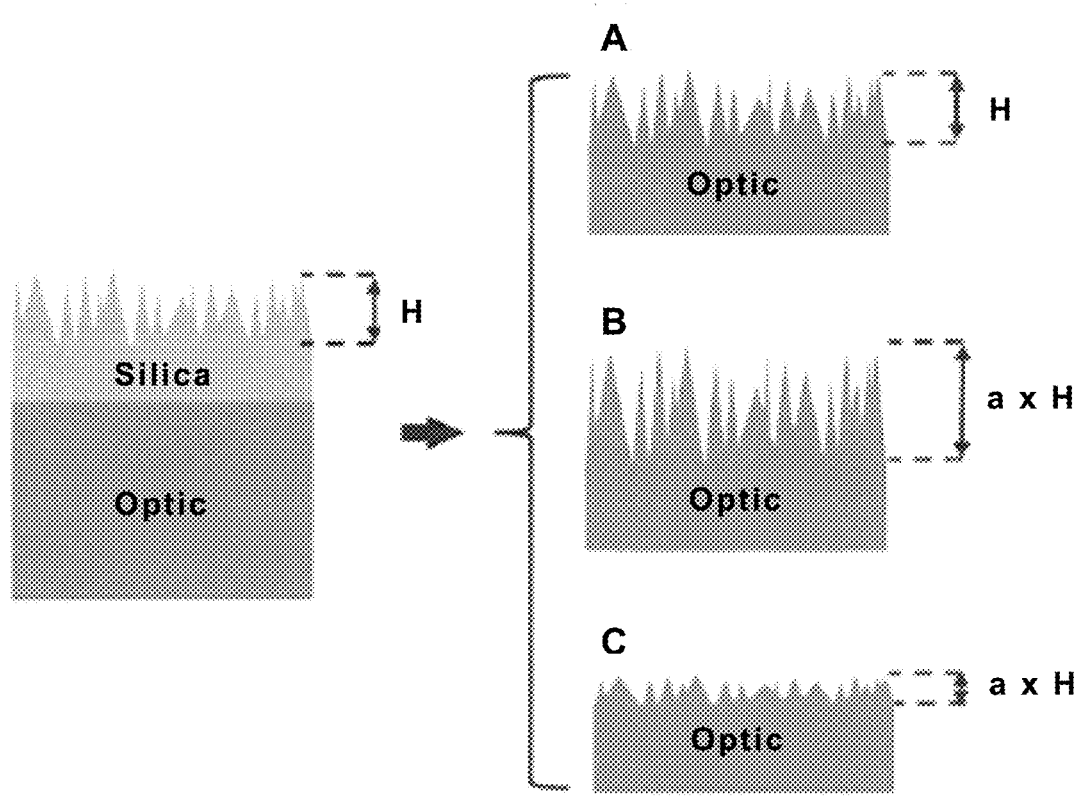
FIGS. 4A-4C are diagrams demonstrating the different feature thicknesses can be achieved by using a mask with features having height H.

FIGS. 4A-4C show examples in which feature height is the same as that in the etch mask, and alternately in which the feature height is scaled by a scale factor, a, to be larger or smaller than the features in the etch mask. The resulting ARSS features may have a height of H, as shown in FIG. 4A. Alternatively, the ARSS features may have a height of a×H. When a is greater than 1, the result is shown in FIG. 4B. When a is less than 1, the result is shown in FIG. 4C. The scale factor may be selected based on the wavelength or wavelength range for which surface reflection is to be reduced, and this can be accomplished by selecting etching chemicals and conditions (i.e., an etch recipe) that result in a greater or lesser degree of etching of the surface of the optical element being coated with ARSS. The magnitude of a may be controlled by choosing an etch recipe for which the selectivity of the optic to the mask material is other than unity. If the relative etch rate of the optic to that of the mask is <1, then, typically, a<1. If the relative etch rate of the optic to that of the mask is >1, then, typically, a>1. Selectivity of the etch recipe for different materials is the result of a number of factors including etch gases, power, sample temperature, amount of power to the electrodes in the RIE, and amount of power supplied to the ICP.

In addition to height H, the shape of features in the optic can also be transformed in comparison to those in the etch mask. They may be more rounded or straight-walled than those in the etch mask, depending on the material of the selected optical element and the selected etching parameters. The transfer of feature shape from the etch mask to the optic may be controlled, for example, by selection of the material used for the etch mask, and/or by selection of the etch conditions.

The etch mask may be entirely etched away during Step 3. However, if this is not the case, optional Step 4 may be carried out in which the remaining silica is etched in a suitable wet chemical etch that is selective for the silica or ZnO mask layer, but does not etch the optic. This etchant may be dilute hydrofluoric acid, but any other suitable etchant may be used.

The methods of the invention beneficially result in an optic that has rARSS on its surface, without having a film or foreign material deposited thereon. The Fresnel reflection coefficient of the optics produced by the methods of the invention are reduced in comparison to those of untreated optics.

Optimization of the etching process may be carried out in order to significantly reduce reflection loss, resulting in increased transmission through the optical element having ARSS, while reducing or eliminating back reflections and ghost reflections that can be detrimental, particularly to the performance of multi-element optical systems. In some preferred embodiments, first an effective etch chemistry for the material of the optic is found, then etch time and power supplied to the RIE is varied until reflection loss is minimized.

It will, of course, be appreciated that the above description has been given by way of example only and that modifications in detail may be made within the scope of the present invention.

Throughout this application, various patents and publications have been cited. The disclosures of these patents and publications in their entireties are hereby incorporated by reference into this application, in order to more fully describe the state of the art to which this invention pertains.

The invention is capable of modification, alteration, and equivalents in form and function, as will occur to those ordinarily skilled in the pertinent arts having the benefit of this disclosure. While the present invention has been described with respect to what are presently considered the preferred embodiments, the invention is not so limited. To the contrary, the invention is intended to cover various modifications and equivalent arrangements included within the spirit and scope of the description provided above.

What is claimed:

1. A method for fabricating antireflective surface structures on an optical element, comprising:
    providing an optical element;
    applying a film layer to a surface of the optical element;
    performing a first etching step of partially etching the film layer to form a plurality of antireflective surface structures on a first surface of the film layer that is distal from the surface of the optical element, wherein a second surface of the film layer in contact with the surface of the optical element and on an opposite side from the first surface of the film layer is not etched in the first etching step; and
    performing a second etching step of transfer etching the plurality of antireflective surface structures from the first surface of the film layer to the surface of the optical element.

2. The method of claim 1, further comprising:
performing, after the second etching step, a wet etching step of wet etching to remove the film layer that remains after the second etching step.

3. The method of claim 1, wherein the optical element is a window, a lens, a mirror, an end face of an optical fiber, a filter, a beamsplitter, a prism, a grating, or a diffuser.

4. The method of claim 1, wherein the optical element comprises magnesium aluminate spinel ($MgAl_2O_4$), $CaF_2$, Ge, Si, diamond, alumina, a III-V semiconductor, or a II-VI semiconductor.

5. The method of claim 4, wherein the III-V semiconductor is AlN, AlP, AlAs, AlSb, GaN, GaP, GaAs, GaSb, InN, InP, InAs, or InSb.

6. The method of claim 4, wherein the II-VI semiconductor is ZnS, ZnSe, ZnTe, CdS, CdSe, and CdTe.

7. The method of claim 1, wherein the antireflective surface structures formed on the first surface of the film layer are formed as a pattern.

8. The method of claim 1, wherein the film layer comprises silica, silicate glass, zinc oxide, photoresist polymer, and combinations thereof.

9. The method of claim 1, wherein the film layer is applied, in the applying step, by sputtering, vacuum deposition, evaporation, chemical vapor deposition, pulsed-laser deposition, sol-gel synthesis, spin casting, and combinations thereof.

10. The method of claim 1, wherein a thickness of the applied film layer is between 50 nm and 5 µm.

11. The method of claim 1, wherein the film layer is etched, in the first etching step, using HDP etching, ICP-RIE, or RIE.

12. The method of claim 11, wherein the first etching step is carried out in a vacuum chamber.

13. The method of claim 12, wherein the vacuum chamber is maintained at a plasma pressure between 5 mTorr and 100 mTorr during the first etching step.

14. The method of claim 11, wherein the first etching step is performed using a gas comprising ions selected from $F^-$, $C^-$, $C^{+4}$, $O^{-2}$, $B^{+3}$, $S^{-2}$, Ar, and combinations thereof.

* * * * *